United States Patent [19]
Nishigami et al.
[11] Patent Number: 4,995,654
[45] Date of Patent: Feb. 26, 1991

[54] DOOR LOCK APPARTAUS FOR AUTOMOTIVE VEHICLE

[75] Inventors: Takashi Nishigami; Michio Kado, both of Hiroshima, Japan
[73] Assignee: Mazda Motor Corporation, Hiroshima, Japan

[21] Appl. No.: 420,091
[22] Filed: Oct. 11, 1989

[30] Foreign Application Priority Data

Oct. 11, 1988 [JP] Japan .............................. 63-255310

[51] Int. Cl.[5] .............................................. F16L 3/06
[52] U.S. Cl. .......................... 292/216; 292/DIG. 65; 292/DIG. 23
[58] Field of Search ............... 292/DIG. 65, DIG. 23, 292/144, 216, 138, 262; 296/146, 188, 189, 35.2

[56] References Cited

U.S. PATENT DOCUMENTS 3,431,998 3/1969 Martin ................................ 292/144
3,468,392 9/1969 Hass .................................... 292/138
3,713,691 1/1973 Bayless ...................... 292/DIG. 65
3,819,228 6/1974 Cornacchia ................. 292/DIG. 65
4,074,915 2/1978 Saffer ................................. 292/262
4,382,622 4/1983 Ishikawa ..................... 292/DIG. 65
4,616,862 10/1986 Ward .......................... 292/DIG. 27

FOREIGN PATENT DOCUMENTS 2023859 11/1971 Fed. Rep. of Germany ... 292/DIG. 65
62-118862 7/1987 Japan .
896146 5/1962 United Kingdom ................. 70/422

*Primary Examiner*—Eric K. Nicholson
*Attorney, Agent, or Firm*—Fleit, Jacobson, Cohn, Price, Holman & Stern

[57] ABSTRACT

An automotive vehicle door lock apparatus consists of a latch mechanism having a latch for latching a door by latching a striker secured to a vehicle body upon closing the door, a door release or unlatch mechanism for unlatching the door by releasing the striker from the latch and a lock mechanism for locking the door by operationally disabling the unlatching mechanism. The unlatching mechanism is in cooperation with a disconnecting mechanism having an extension arm which extends laterally toward the outer door panel. Upon a lateral car crash, the extension arm is pushed laterally inward by the crushed outer door panel to operate and operationally disable the unlatching mechanism independently of the unlatching mechanism.

5 Claims, 9 Drawing Sheets

DOOR LOCK APPARTAUS FOR AUTOMOTIVE VEHICLE

FIELD OF THE INVENTION

The present invention relates to a door lock apparatus for an automotive vehicle.

BACKGROUND OF THE INVENTION

A door lock mechanism generally automatically latches a door of an automotive vehicle upon closing the door and unlatches it upon pulling a door handle or an interior door handle. The door lock mechanism also locks or unlocks the latched door upon operating a door lock knob or a door lock key cylinder. After locking the door, the door lock mechanism is disabled to unlock the door even though pulling the door handle or the interior door handle. Such a door lock mechanism is known from Japanese Unexamined Utility Model Publication No. 62(1987)-118,862 entitled "Remote Control Rod Connecting Mechanism of a Door Lock Mechanism" laid open July 28, 1987.

For easy door opening by a driver or a passenger in the automotive vehicle, the interior door handle is located in front part of the front-hinged front door and operationally coupled to the door lock mechanism by means of a link member such as a cable extending in a space formed between inner and outer door panels forming the door.

In a door structured from the inner and outer door panels, if the outer door panel is distorted or crushed inward as a result of, for example, being laterally hit while the door is locked, the crushed outer door panel tightly stretches, and thereby pulls, the cable interconnecting the interior door handle and the door lock mechanism. As a consequence, the door lock mechanism can be caused to unlock the door in the same manner as when the door handle or the interior door handle is intentionally operated in order to unlock the front door. This may lend to an accidental plunging of the crushed door into the automotive vehicle compartment and possible injury to the driver or passengers in the automotive vehicle.

SUMMARY OF THE INVENTION

It is, therefore, the primary object of the present invention is to provide a door lock apparatus which prevents a door of an automotive vehicle from being unlocked by a distorting crush of the door, thereby preventing the crushed door from plunging into the vehicle compartment.

The object of the present invention is achieved by providing an automotive vehicle door lock apparatus which consists of a door latch means having a latch for automatically latching a door by latching a striker secured to an automotive vehicle body upon closing the door, a door release or unlatch means and a door lock means. The door releasing mechanism is connected to at least an interior door handle located at a front part of the door by means of a cable extending in a space formed between inner and outer door panels. Upon completely closing the door, the latch of the door latch means, which is pivotally mounted, is engaged by the striker and thereby turned so as to hold the striker within a holding slot of the latch and retained by a pivotally mounted detent means thereby automatically latching said door. The door unlatch means consists of an unlatching rocker arm pivotally mounted and operationally coupled to the interior door handle by the cable and a link pivotally mounted on the door unlatching rocker arm at one end thereof by means of a first connecting pin, the unlatching rocker arm being swung by at least the interior door handle to bring the link into engagement with the detent means so as to cause the detent means to release the latch, thereby releasing the striker and unlatching the door. The door lock means consisting of a door locking rocker arm pivotally mounted on and slidably connecting the other end of the link thereto by means of a second connecting pin, the door locking rocker arm being swung by the door lock means operationally coupled thereto by means of a cable to swing the link about the first connecting pin so as to disconnect the link from the detent means, thereby locking the door.

A disconnecting means is incorporated in the door lock apparatus and has an extension arm which extends laterally toward the outer door panel. The extension arm is pushed laterally inward by the outer door panel as a result of crushing of the outer door panel to swing the link about either one of the first and the second connecting pins so as to operationally disconnect the link from the detent means.

According to the present invention, even if the cable, extending in the space formed between the inner and outer door panels and operationally interconnecting the interior door handle and the door lock apparatus, is pulled by the outer door panel as a result of crashing laterally inward, the front door is still kept locked and, therefore, the front door is retained by a vehicle body through the door lock apparatus and the door hinges and prevented from being removed from the vehicle body or plunging into the vehicle compartment.

The extension arm is provided in association with one of the link, the door locking rocker arm and a connecting slider connecting the door handle

BRIEF DESCRIPTION OF THE DRAWINGS

Still other objects of the invention and more specific features will become apparent to those skilled in the art from the following description of the preferred embodiment, considered together with the accompanying drawings, wherein like reference characters have been used in the different figures to denote the same parts and in which.

DESCRIPTION OF THE PREFERRED EMBODIMENTS

The following description will be directed to a fork-pin type door lock apparatus incorporated in a front-hinged front door which is locked by means of the engagement between a latch means of the front door and a striker of a vehicle body.

It is to be noted throughout the description that the term "clockwise" or "counterclockwise" direction means a direction as viewed from the front side of door.

Figure 1:
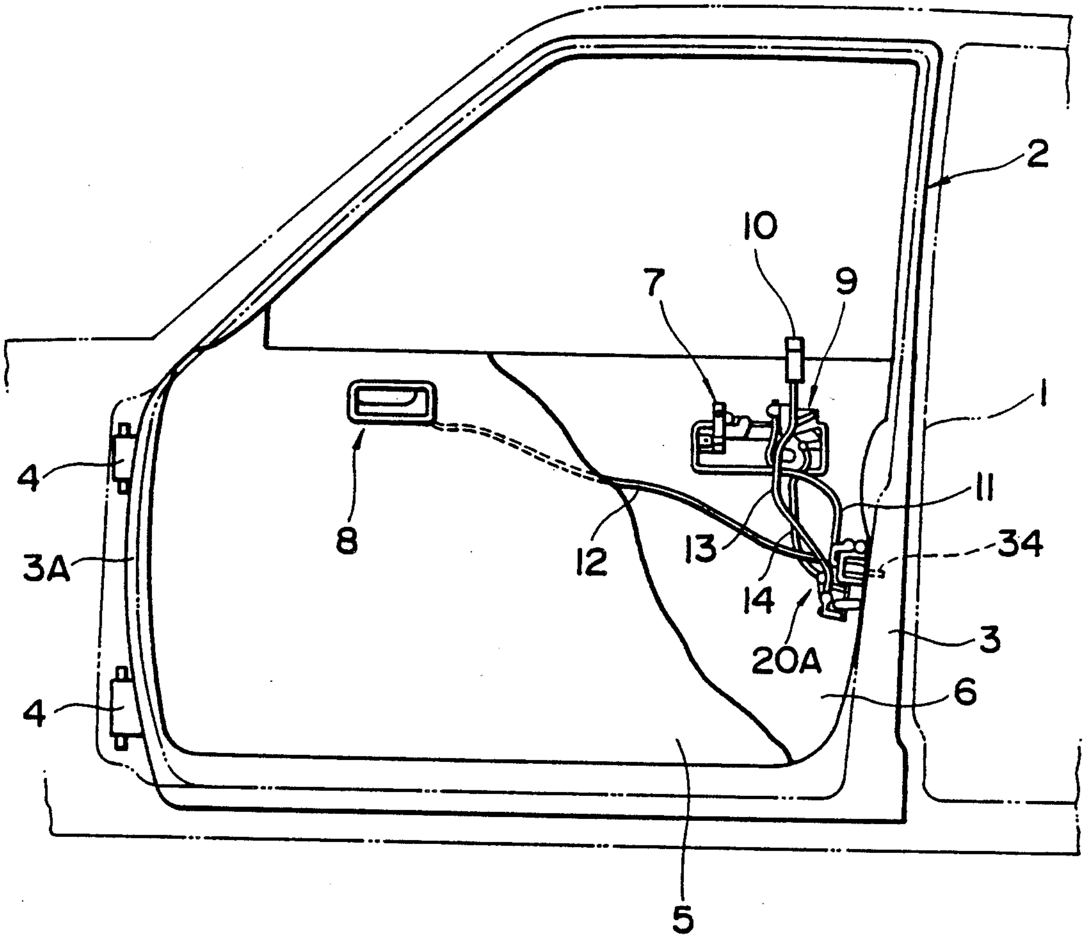
FIG. 1 is a schematic illustration showing a front-hinged front door in which the present invention is embodied.
Figure 2:
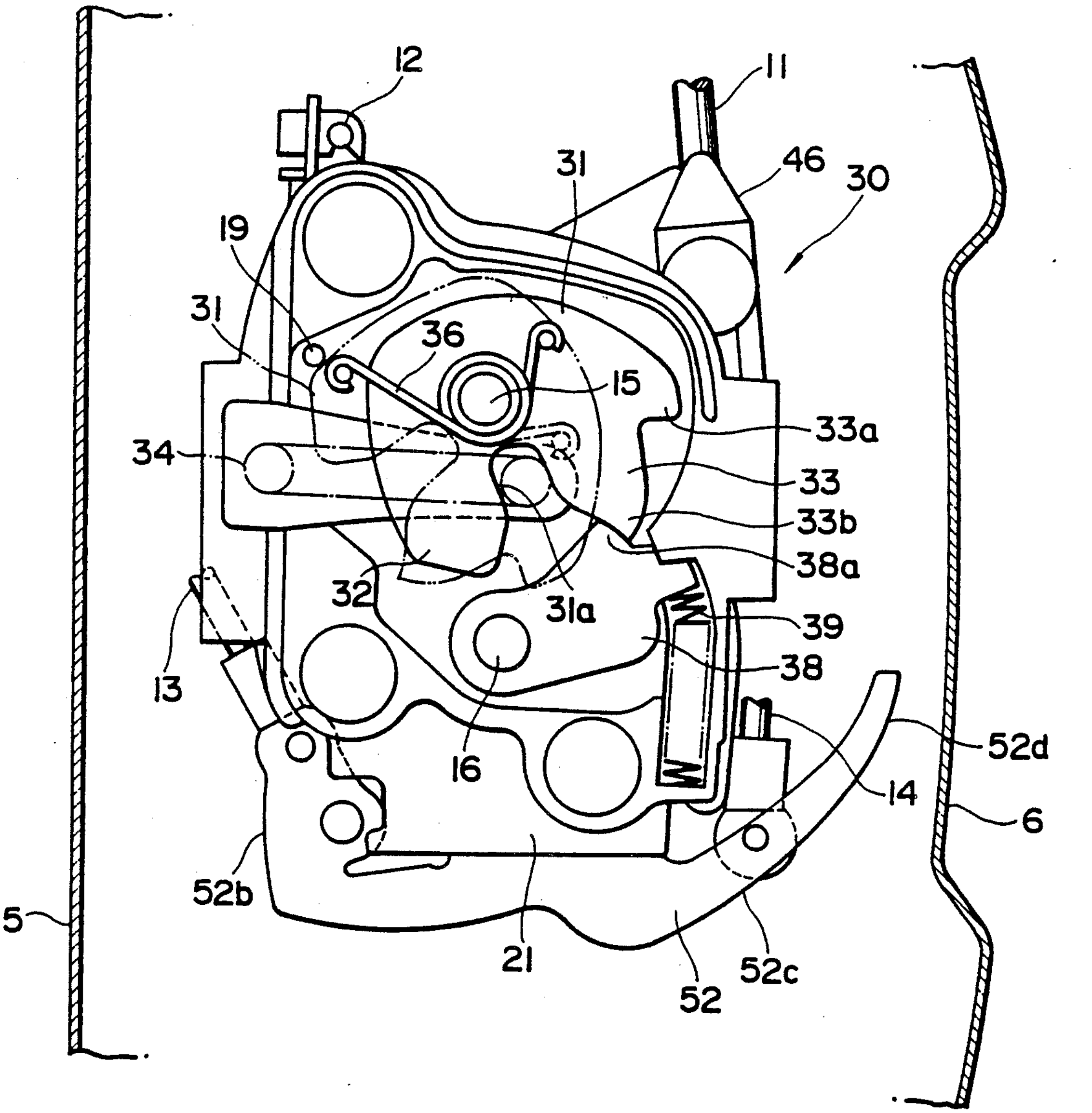
FIG. 2. is a rear view of a door lock apparatus in accordance with a preferred embodiment of the present invention.
Figure 3:
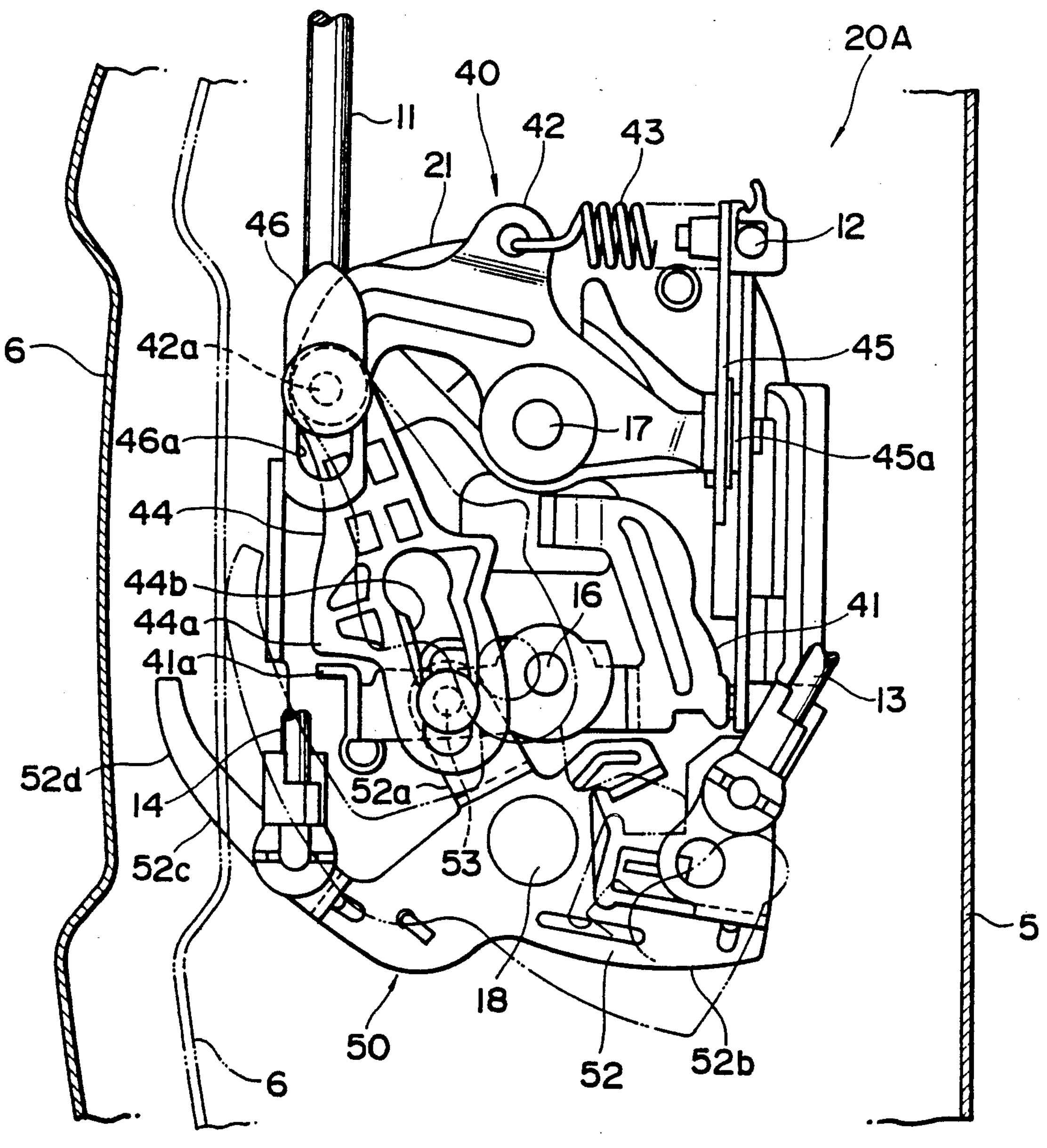
FIG. 3 is a front view of the door lock apparatus shown in FIG. 2.

Referring to the drawings in detail, particularly to FIGS. 1 to 3, a front door 2 incorporating a door locking apparatus in accordance with a preferred embodiment of the present invention is shown, comprising a door frame 3 forming an upper opening for a window glass (not shown), and inner and outer door panels 5 and 6 forming a lower half of the front door 2. The inner and outer door panels 5 and 6 provide a space therebetween. The front door frame 3 is pivoted on a vehicle body 1 by means of hinges 4 secured to its front frame member *3a*. A door locking apparatus 20A, which is mounted on a base plate 21 secured between the inner and outer door panels 5 and 6, operates in cooperation with a door handle 7, an interior door handle 8, a door lock key cylinder 9 and a door lock button 10 operationally connected thereto by means of pull link cables 11 and 12, and push-pull link cables 13 and 14, respectively.

The door lock apparatus 20A consists of a door latch mechanism 30, a door release or unlatch mechanism 40 and a door lock mechanism 50. The door latch mechanism 30 and its associated elements or parts are mounted on the base plate 21 on the rear side of the base plate 21 and the remaining mechanisms 40 and 50 and their associated elements or parts are mounted on the base plates 21 on the front side of the base plate 21. The door latch mechanism 30 includes a latch 31 for releasably latching a generally U-shaped striker 34 secured to the body frame 1 when the front door is closed. The latch 31, which is pivotally mounted on a fixed pin 15, is formed with arms 32 and 33 providing a holding slot *31a* therebetween for receiving the striker 34. The arm 33 of the latch 31 is formed with a first engaging shoulder *33a* projecting from the base section thereof and a second engaging shoulder *33b* at the top thereof. A helical spring 36 which is mounted on the fixed pin 15 and stretched between the base plate 21 and the latch 31, serves as a return spring to drive the latch 31 in the counterclockwise direction and return it to its broken line position where the latch 31 is stopped by means of a stop pin 19 and unlatches the striker 34.

A journal 16 penetrating the base plate 21 is rotatably mounted on lower part of the base plate 21. The journal 16 is provided with a stopper arm 38 secured to the rear end on the rear side of the base plate 21 and an open lever 41 (see FIG. 3) secured to the front end thereof on the front side of the base plate *21a*. The stopper arm 38, which is forced or urged in the counterclockwise direction by means of a tension spring 39, is formed with an engaging shoulder *38a* capable of engaging the first engaging shoulder *33a* of the latch 31 or the second engaging shoulder *33b*.

Upon closing the front door 2, the latch 31 is engaged by the striker 34 through the holding slot *31a* and turned thereby about the fixed pin 15 in the clockwise direction against the return spring 36. When the front door 2 is completely closed, the latch 31 is brought into its illustrated full-line position where the latch 31 is held by the stopper arm 38 through the engagement between the second engaging shoulder *33b* of the latch 31 and the engaging shoulder *38a* of the stopper arm 38. However, if the front door 2 is incompletely closed, the latch 31 is turned halfway to bring the first engaging shoulder *33a* into engagement with the first engaging shoulder *38a* of the stopper arm 38. This is referred to as a half-latch condition.

The door release or unlatch apparatus 40 coacts with the door lock mechanism 30 so as to release or unlatch the latch 31 from the stopper arm 38 by disengaging the engaging shoulder *38a* of the stopper arm 38 from the first or the second engaging shoulder *33a* or *33b* of the latch 31. As shown in detail in FIG. 3, the open lever 41 is, as was described previously, secured to the front end of the rotatable journal 16 supported by the base plate and extending on the both sides of the base plate 21. The open lever 41 has an outer extension formed with a bracket arm *41a*. Because of the substantially integral structure of the journal 16, the stopper arm 38 and the open lever 41, the open lever 41 is also forced or urged in the counterclockwise direction by means of the tension spring 39. The open lever 41, when the front door 2 is closed, is held in its illustrated full-line position by means of a stop pin (not shown) mounted on the base plate 21. Above the open lever 41, a door releasing arm 42 in the form of a rocker arm is pivotally mounted on a rocking pin 17, secured to the base plate 21, and is forced or urged in the counterclockwise direction by means of a coil spring 43 attached to the upper middle thereof. The door releasing rocker arm 42 is provided with a round head connecting pin *42a* secured to one end thereof for pivotally mounting a link 44 which extends downward and is formed with an elongated slot *44b* in the lower part thereof. The link 44 is formed with a engaging shoulder *44a* laterally outwardly projecting therefrom at the middle which is engaged by the top of the bracket arm *41a* of the open lever 41 when the link 44 moves downward. The other end of the door releasing rocker arm 42 opposed to the one end thereof with respect to the rocking pin 17 is operationally coupled to a lower arm of a bell crank 45 pivotally mounted on a mounting pin *45a*. The round head connecting pin *42a* secured to the door releasing rocker arm 42 is slidably received in a slot *46a* of a connecting slide 46 connected to one end of the push cable 11. The push cable 11 connects the connecting slide 46 and the door handle 7 so as to push down the connecting slide 46 when the door handle 7 is pulled. Accordingly, when the door handle 7 is pulled, the link 44 is forced down so as to bring the engaging shoulder *44a* into engagement with the bracket arm *41a* of the open lever 41, thereby turning the open lever 41 structurally integral with the journal 16 and the stopper arm 38 in the counterclockwise direction. This disengages the engaging shoulder *38a* of the stopper arm 38 from the first or the second engaging shoulder *33a* or *33b* of the arm 33 of the latch 31, so as to release or unlatch the latch 31.

The bell crank 45 is operationally connected at its upper end to the interior door handle 8 by means of the push cable 12. When the interior door handle 8 is pulled, the bell crank 45 is forced to turn about the mounting pin *45a* so as to turn the door releasing rocker arm 42 about the rocking pin 17 in the counterclockwise direction. The counterclockwise motion of the door releasing rocker arm 42 forces the link 44 downward. Then, in the same manner as when the door handle 7 is pulled, the stopper arm 38 is turned in the counterclockwise direction, thereby disengaging the engaging shoulder 38*a* of the stopper arm 38 from the first or the second engaging shoulder 33*a* or 33*b* of the arm 33 of the latch 31 so as to release or unlatch the latch 31.

The door lock mechanism 50 is structured so as to prevent the bracket arm 41*a* of the open lever 41 from being engaged with the engaging shoulder 44*a* of the link 44 even when the link 44 is moved down by means of the door handle 7 or the interior door handle 8. As shown in FIG. 3, below the open lever 41, a door locking Rocker arm 52 in the form of a substantially trifurcate rocker arm is pivotally mounted on a rocking pin 18 which is secured to, and extends on one side of, the base plate 21. The door locking rocker arm 52 is provided with a round head connecting pin 53 secured to a first or center arm 52*a* which is slidably received in the elongated slot 44*b* of the link 44 so as to operationally couple the door locking rocker arm 52 and the link 44 together. A second or inner arm 52*b* and a third or outer arm 52*c* of the door locking rocker arm 52 are operationally coupled to the door lock button 10 by means of the drag push-pull cable 13 and the door lock key cylinder 9 by means of the drag push-pull cable 14. The door locking rocker arm 52 is integrally formed with an arm extension 52*d* extending from the outer arm 52*c* near the outer door panel 6 of the front door 2.

When the door lock key cylinder 9 or the door lock button 10 is operated in a direction, the door locking rocker arm 52 is turned in the clockwise direction, thereby turning the link 44 in the counterclockwise direction so as to displace the link 44 to a position shown in a dotted line in FIG. 3. As a result, even if the door handle 7 and/or the interior door handle 8 is operated the direction, causing the door releasing rocker arm 42 to turn in the counterclockwise direction so as to force the link 44 downward, the engaging shoulder 44*a* of the link 44 is never brought into engagement with the bracket arm 41*a* of the open lever 41. Accordingly, the operation of the door lock key cylinder 9 or the door lock button 10 causes no releasing or unlatching action in the door locking apparatus 20A, so as to prevent the front door 2 from opening.

In operation of the door locking apparatus 20A thus structured, to open the door 2, the door handle 7 or the interior door handle 8 is pulled. Pulling the door handle 7 or the interior door handle 8 causes the door releasing rocker arm 42 to turn in the counterclockwise direction through the push cable 11 or 12, so as to move the link 44 downward. The engaging shoulder 44*a* of the link 44 is forced to engage with the bracket arm 41*a* of the open lever 41 and then, pushes the same down, so that the open lever 41 integrally coupled to the stopper arm 26 by the journal 16 turns in the counterclockwise direction. While the open lever 41 turns, the stopper arm 38, in particular the engaging shoulder 38*a* thereof, comes off the second or the first engaging shoulder 33*b* or 33*a* of the latch 31, allowing the latch 31 to turn in the counterclockwise direction under the force of the return spring 36. Accordingly, the latch 31 disengages and releases the striker 34 from the holding slot 31*a* thereof and quickly turns to the releasing position shown in a dotted-line in FIG. 2 pushing the striker 34, and hence the front door 2, outwardly. Then the front door 2 is rendered openable.

With closing the front door 2, the holding slot 31*a* of the latch 31 is entered by the striker 34 and thereby, the latch 31 is turned in the counterclockwise direction against the return spring 36. Upon completely closing the front door 2 the latch 31 is forced to its illustrated full-line latch position at a stroke displacing the stop arm 26 with the periphery thereof. The latch 31 holds the striker 34 within the holding slot 31*a* thereof and is retained by the stopper arm 26 through the engagement between the engaging shoulder 26*a* of the stopper arm 26 and the second shoulder 33*b* of the latch 31. Thus, the door lock apparatus 20A completely latches the front door 2. On the other hand, if the front door 2 is insufficiently closed, the latch 31, after being turned halfway, tends to return toward its releasing position under the force of the return spring 36. However, the stopper arm 38 engages the first engaging shoulder 33*a* of the latch 31 by the engaging shoulder 38*a* thereof, preventing the latch 31 from returning to the releasing position, so that the latch 31 still holds the striker 34 within the holding slot 31*a* and thereby, although insufficiently, latching the front door 2.

When pushing the door lock button 10 in or turning the door lock key cylinder 9 in order to lock the front door 2, the door locking rocker arm 52 is turned about the rocking pin 18 in the clockwise direction, thereby turning the link 44 about the first connecting pin 42*a* secured to the door releasing rocker arm 42 in the counterclockwise direction to its lock position shown in a dotted-line so as to displace the engaging shoulder 44*a* of the link 44 inwardly away from the bracket arm 41*a* of the open lever 41. As a result, even though the door handle 7 or the interior door handle 8 is pulled in attempting to turn the door releasing rocker arm 42 and thereby move the link 44 downward for opening door, the bracket arm 41*a* of the open lever 41 is never engaged by the engaging shoulder 44*a* of the link 44 and accordingly, the open lever 41, and hence the stopper arm 38, is not actuated, so that the stopper arm 26 keeps the latch 31 retained in the illustrated full-line latching position and the door lock apparatus 20A keeps the front door 2 locked.

To unlock the front door 2, it is sufficient to pull out the the door lock button 10 or return the door lock key cylinder 9 to return the door locking rocker arm 52, in the counterclockwise direction, to the illustrated full-line unlock position. The engaging shoulder 44*a* of the open link lever 44 is returned right above the bracket arm 41*a* of the open lever 41.

If the outer door panel 6 of the front door 2 is distorted or crushed inwardly as a result of, for example, being laterally hit while the front door 2 is locked, the crushed outer door panel 6 tightly stretches and thereby pulls the cable 12 connecting the interior door handle 8 and the door locking apparatus 20A, in particular the bell crank lever 45 of the door unlatch mechanism 40. As a consequence, the door releasing rocker ar m 42 is forced to turn in the counterclockwise direction, thereby moving the link 44 down in the same manner as when the door handle 7 or the interior door handle 8 is pulled attempting to open the front door 2. This will lead to accidental opening the front door 2.

However, before the engaging shoulder 44*a* of the link 44 is brought into engagement with the bracket arm 41*a* of the open lever 41, the inwardly crashed outer door panel 6 pushes the arm extension 52*d* of the outer arm 52*c* of the door locking rocker arm 52 and displaces it toward its locking position, whereby displacing the engaging shoulder 44*a* of the link 44 inwardly away from the bracket arm 41*a* of the open lever 41 in the same manner as when the door lock button 10 is pushed in or when the door lock key cylinder 9 is turned on with attempted locking the front door 2. As a result, even if the cable 12 is pulled by the crushed outer door panel 6, the front door 2 is kept locked. In other words, upon crushing, the front door 2 is still retained by a vehicle body through the door lock apparatus 20A and the door hinges 4 and accordingly, is prevented from being removed from the vehicle body 1 or plunging into the vehicle compartment.

Figure 4:
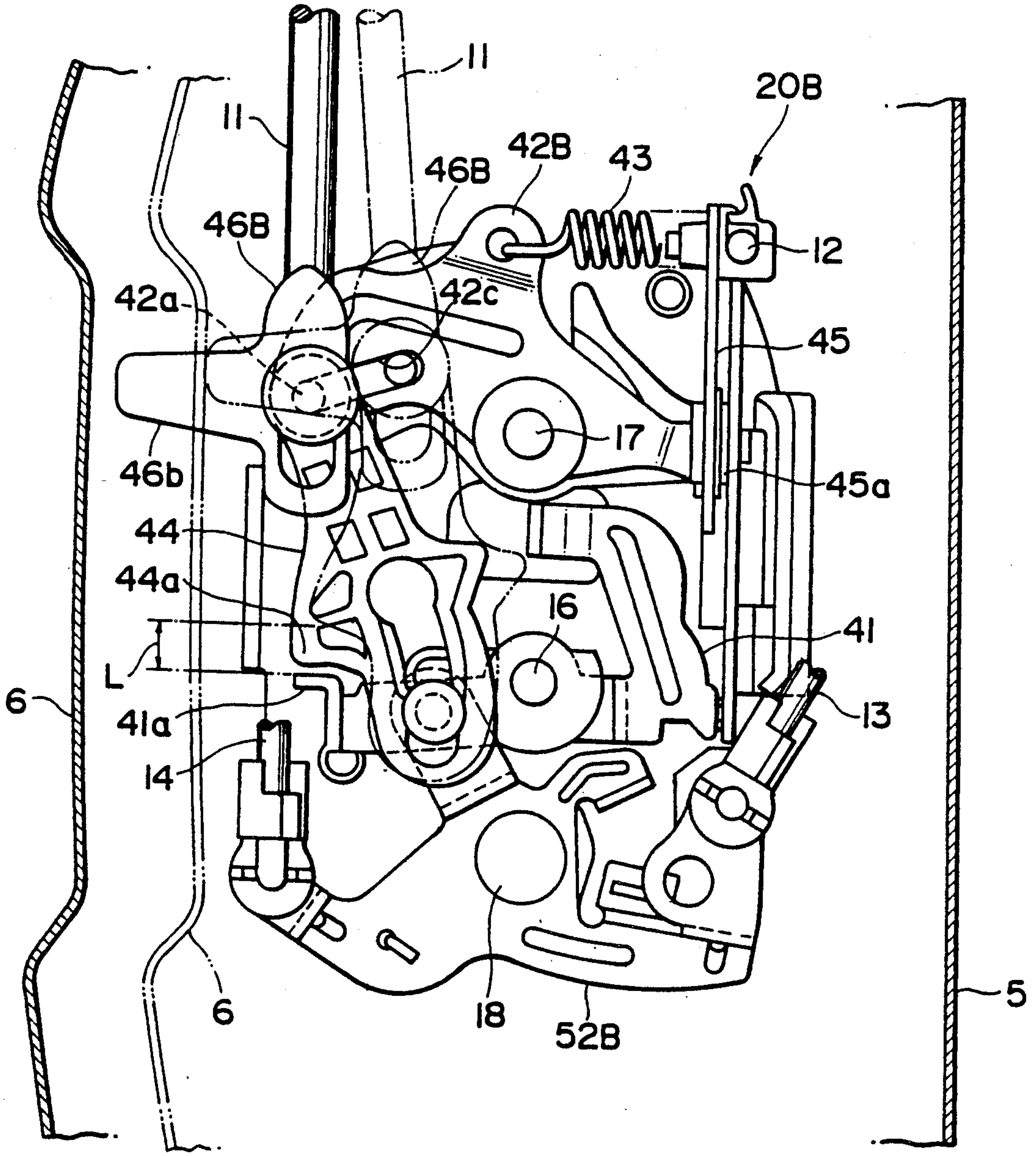
FIG. 4 is a rear view of a door lock apparatus in accordance with another preferred embodiment of the present invention.
Figure 5:
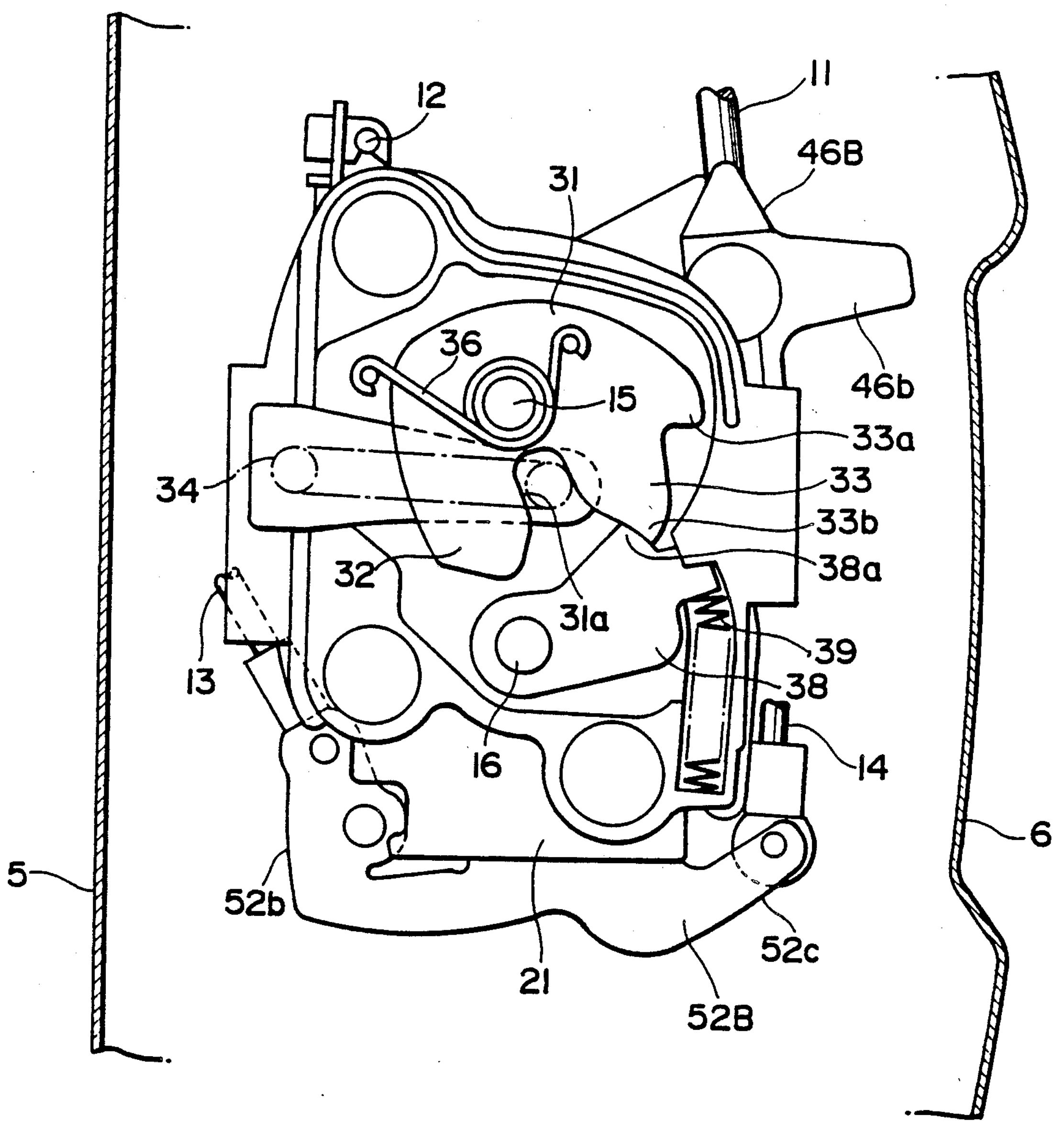
FIG. 5 is a front view of the door lock apparatus shown in FIG. 4.

Referring to FIGS. 4 and 5, a door locking apparatus 20B in accordance with another preferred embodiment of the present invention is shown. In this embodiment, an extension to be pushed by the crushed outer door panel 6 is integrally formed with the connecting slide and accordingly, the door locking rocker arm 52 is provided with no part corresponding to the third arm 52*c* and arm extension 52*d* shown in FIG. 3. As shown in FIG. 4, the connecting slide 46B, which is connected to one end of the push cable 11, is formed with the extension 46*b* extending laterally outwardly toward the outer door panel 6. The round head connecting pin 42*a*, which is secured to the upper end of the link 44, operationally connects a door releasing rocker arm 42B and the link 44 partly laid one upon another. The door releasing rocker arm 42B is formed with a guide slot 42*c* inclined inwardly and up in which the connecting pin 42*a* is slidably received.

In this embodiment, when the outer door panel 6 of the front door 2 is inwardly distorted or crushed, the crashed outer door panel 6 pushes the extension 46*b* of the connecting slide 46, forcing the connecting pin 42*a* to slide in the guide slot 42*c* of the door releasing rocker arm 42B. As a consequence, the link 44 is turned about the second connecting pin slidably connecting the link 44 and a door locking rocker arm 52B in the clockwise direction and simultaneously, lifted up as a result of the sliding movement of the connecting pin 42*a* along the upwardly inclined guide slot 42*c* of the door releasing rocker arm 42B, whereby increasingly changing the distance between the engaging shoulder 44*a* of the link 44 and the bracket arm 41*a* of the open lever 41. The increased distance L between the engaging shoulder 44*a* of the link 44 and the bracket arm 41*a* of the open lever 41 disables the engaging shoulder 44*a* of the link 44 to engage the bracket arm 41*a* even if the link 44 is moved down by stretching and pulling the cable 12 by the crushed outer door panel 6. Accordingly, the front door 2 is not unlocked.

Figure 6:
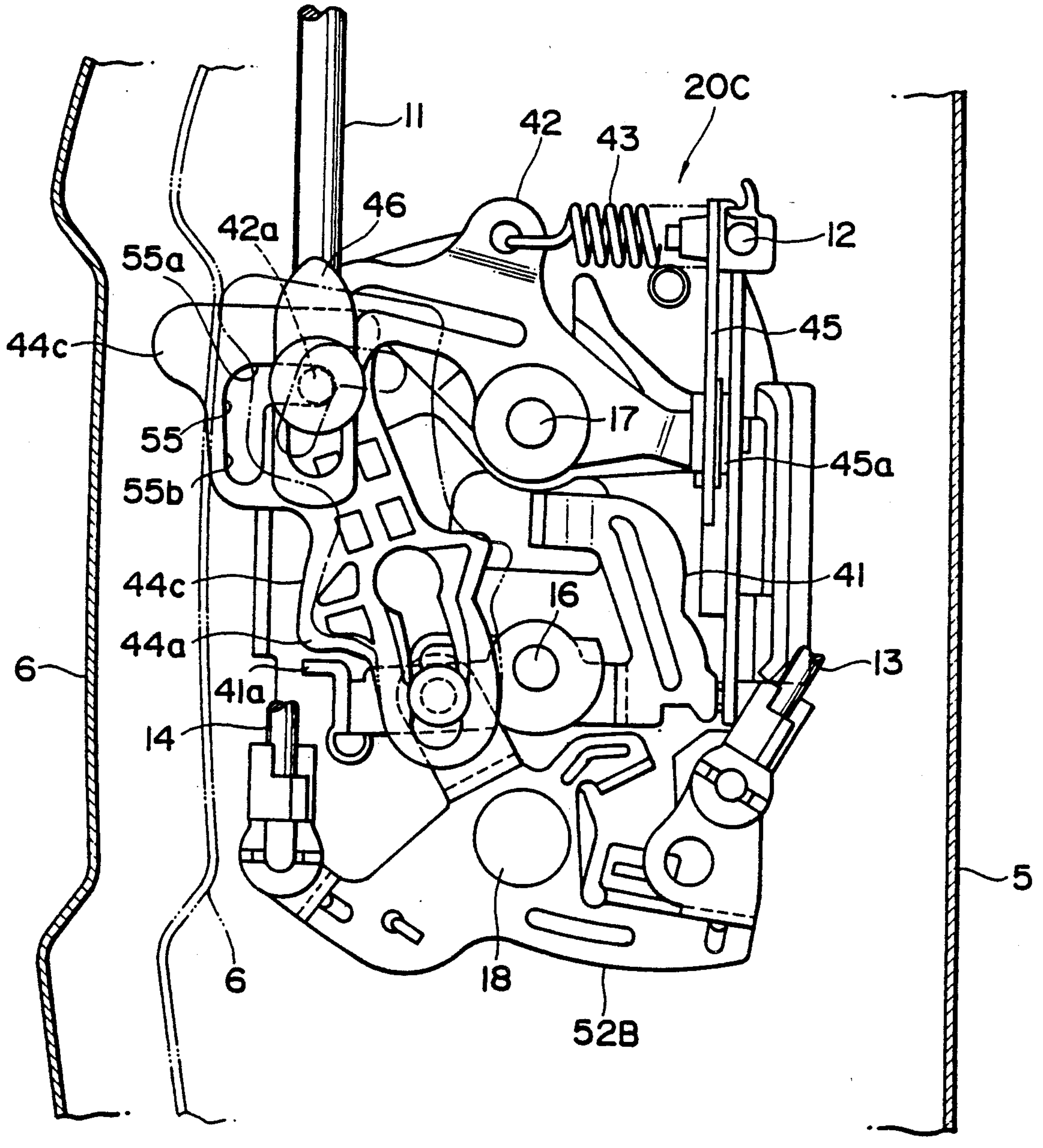
FIG. 6 is a rear view of a door lock apparatus in accordance with still another preferred embodiment of the present invention.
Figure 7:
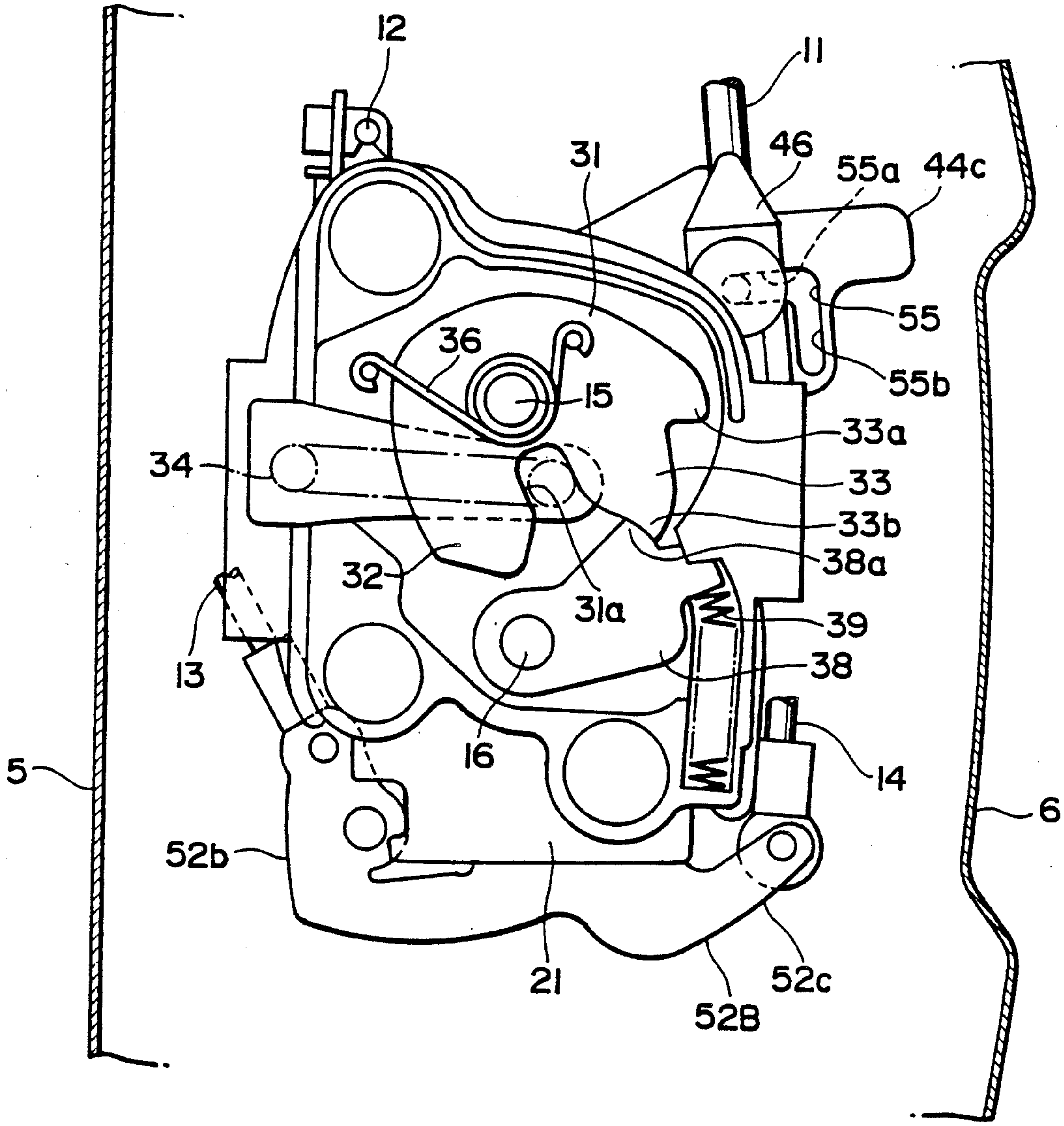
FIG. 7 is a front view of the door lock apparatus shown in FIG. 6.

Referring to FIGS. 6 and 7, a door locking apparatus 20C in accordance with still another preferred embodiment of the present invention is shown, having a link extension 44*c* integrally formed with a link 44C similar to the link 44 shown in FIG. 3 and no part corresponding to the third arm 52*c* and arm extension 52*d* shown in FIG. 3. As shown, the link 44C is formed with the link extension 44*c* extending laterally outwardly near the outer door panel 6 from the top thereof. The link extension 44*c* of the link 44C is formed with a generally inversed L-shaped guide slot 55 consisting of a horizontal slot 55*a* and a vertical slot 55*b* in which the round head connecting pin 42*a* secured to the door releasing rocker arm 42 is slidably received.

In this embodiment, when the outer door panel 6 of the front door 2 is inwardly distorted or crushed, the crashed outer door panel 6 pushes the link extension 44*c* of the link 44C, forcing the link 44C to turn about the second connecting pin 53 in the clockwise direction. As a result, the connecting pin 42*a* relatively slid in the horizontal slot 55*a* and located in an upper part of the vertical slot 55*b* of the L-shaped guide slot 55. The location of the connecting pin 42*a* in the upper part of the vertical slot 55*b* of the L-shaped guide slot 55 disables the link 44C from being moved down by the door releasing rocker arm 42 even if the door releasing rocker arm 42 is forced to turn in the counterclockwise direction by pulling the cable 12 by the crushed outer door panel 6. Accordingly, the front door 2 is prevented from being opened.

Figure 8:
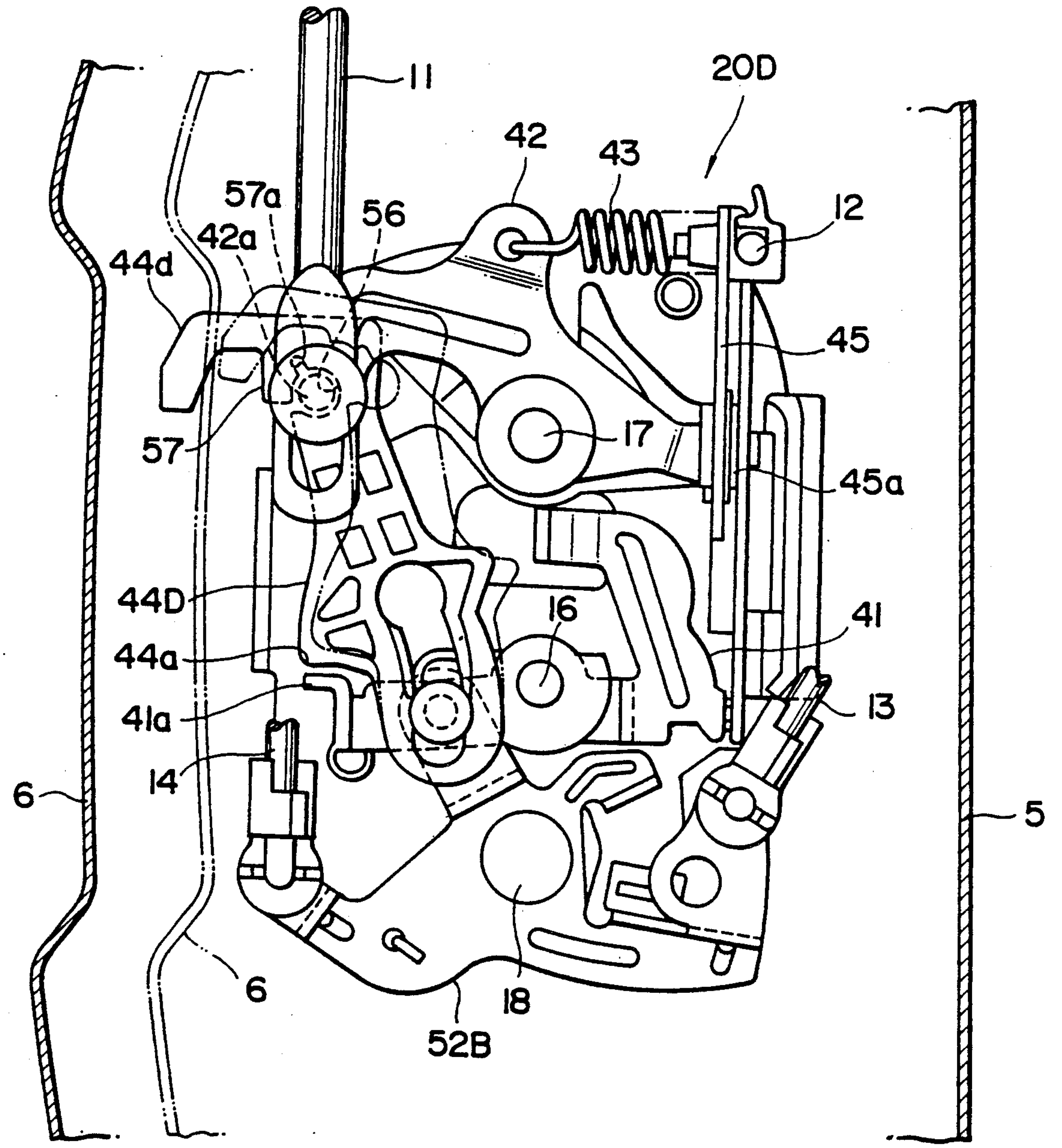
FIG. 8 is a rear view of a door lock apparatus in accordance with a further preferred embodiment of the present invention.
Figure 9:
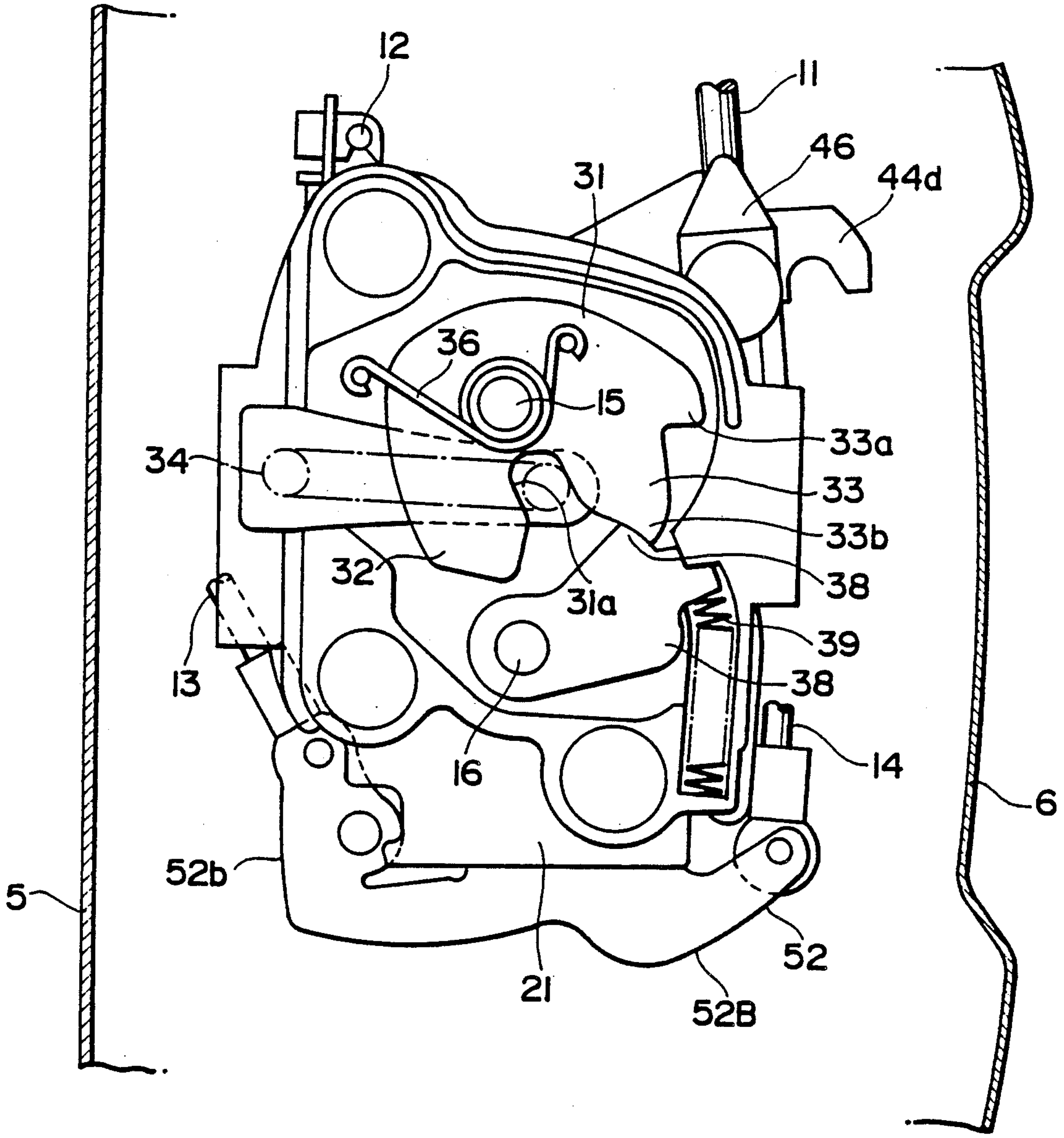
FIG. 9 is a front view of the door lock apparatus shown in FIG. 8.

Referring to FIGS. 8 and 9, a door locking apparatus 20D in accordance with a further preferred embodiment of the present invention is shown, having a link 44D with a link extension 44*d* similar to the link 44 shown in FIG. 3. As shown, the link 44D, which is formed with the integral link extension 44*d* extending laterally outwardly near the outer door panel 6 from the top thereof, has a generally semi circular indent 56 which is formed in upper part thereof and of which the opening is partly covered by a breakable retainer tab 57 extending down from the lever link extension 44*d* so as to loosely and partly encircle the connecting pin 42*a* therein. The breakable retainer tab 57 is formed with a notch 57*a* at the root thereof so as to be easily broken by a slightly high shearing force imparted laterally thereto.

In this embodiment, when the outer door panel 6 of the front door 2 is inwardly distorted or crushed, the crashed outer door panel 6 pushes the link extension 44*d* of the link 44D, forcing the breakable retainer tab 57 against the connecting pin 42*a*. As a consequence, the connecting pin 42*a* reacts on the breakable retainer tab 67 so as to impart a high shearing force to the breakable retainer tab 57. As a consequence, the breakable retainer tab 57 fractures from the shearing force so as to thereby allow the connecting pin 42*a* to be released from the semi-circular indent 56 and simultaneously, the link 44D to turn in the clockwise direction. When the link 44D actually turns in the clockwise direction, the engaging shoulder 44*a* of the link 44D is disabled to engage the bracket arm 41*a* of the open lever 41. Accordingly, even if the door releasing rocker arm 42 is turned in the counterclockwise direction by pulling the cable 12 as a result of the crush of the outer door panel 6, the front door 2 is still kept locked.

It should be noted that various changes and modifications are apparent to those skilled in the art which are within the scope of the invention, and such changes and modifications are intended to be covered by the following claims.

What is claimed is:

1. An automotive vehicle door lock apparatus which is mounted on a base plate disposed between inner and outer door panels of a door of an automotive vehicle for automatically latching said door when said door is closed, unlatching said door by at least an interior door handle operationally coupled to said door lock apparatus by means of a cable extending in a space formed between said inner and outer door panels so as to allow said door to be opened and locking said door by a door lock member operationally coupled to said door lock apparatus by means of a cable so as to prevent said door from being unlatched, said door lock apparatus comprising:

a door latch means comprising a latch pivotally mounted on said base plate which is engaged and turned by a striker secured to a body of said automotive vehicle so as to retain said striker when said door is closed and a detent means pivotally mounted on said base plate which is in cooperation with said latch to hold said latch when said latch is turned to retain said striker, thereby automatically latching said door;

a door unlatch means comprising an unlatching rocker arm pivotally mounted on said base plate and operationally coupled to said interior door handle by said cable and a link pivotally mounted on said unlatching rocker arm at one end thereof by means of a first connecting pin, said unlatching rocker arm being swung by at least said interior door handle to bring said link into engagement with said detent means so as to cause said detent means to release said latch, thereby releasing said striker and unlatching said door;

a door lock means comprising a locking rocker arm pivotally mounted on said base plate and slidably connecting the other end of said link thereto by means of a second connecting pin, said locking rocker arm being swung by said door lock member operationally coupled thereto by means of a cable to swing said link about said first connecting pin so as to disconnect said link from said detent means, thereby locking said door; and a disconnecting means, cooperating with said one end of said link and extending laterally toward said outer door panel and being moved laterally inward by said outer door panel as a result of crushing of said outer door panel to swing said link about said second connecting pin so as to operationally disconnect said link from said detent means, thereby preventing said door from being opened, and formed as an integral extension of said link formed with a breakable retainer tab for partly and loosely encircling said first connecting pin so as to connect said link to said first connecting pin, said breakable retainer tab being broken by a slightly high shearing force imparted laterally thereto from said first connecting pin when said link is moved laterally inward by said outer door panel as a result of crushing of said outer door panel through said integral extension, thereby allowing said link to swing about said second connecting pin.

2. An automotive vehicle door lock apparatus as defined in claim 1, wherein said detent means comprises a detent plate engageable with said latch and an arm engageable with said link, said detent plate and arm being disposed on opposed sides of said base plate and integrally interconnected to each other by means of a shaft pivotally mounted on said base plate.

3. An automotive vehicle door lock apparatus as defined in claim 2, wherein said unlatching rocker arm is coupled at one end thereof where said one end of said link is connected to a door handle by means of a push cable and at the other end thereof to a interior door handle by means of said pull cable.

4. An automotive vehicle door lock apparatus as defined in claim 3, wherein said the other end of said unlatching rocker arm is connected to said pull cable through a bell crank.

5. An automotive vehicle door lock apparatus as defined in claim 3, wherein said locking rocker arm is coupled at one end thereof to a door lock button by means of a push pull cable and at the other end thereof to a door lock key cylinder by means of a push-pull cable.

* * * * *